United States Patent [19]
Hisamitsu et al.

[11] Patent Number: 5,851,605
[45] Date of Patent: Dec. 22, 1998

[54] ADHESIVE PARTICULATE COMPOSITION, ADHESIVE SPACERS FOR LIQUID CRYSTAL DISPLAY PANEL, AND LIQUID CRYSTAL DISPLAY PANEL

[75] Inventors: Shinji Hisamitsu, Osaka; Teruhisa Ishihara; Katsuya Tamaki, both of Ishikawa; Shigefumi Kuramoto, Osaka; Yasuhiro Sakai, Osaka; Shinji Takasaki, Osaka, all of Japan

[73] Assignees: Matsushita Electric Industrial Co., Ltd.; Nippon Shokubai Co., Ltd., both of Japan

[21] Appl. No.: 772,430

[22] Filed: Dec. 24, 1996

[30] Foreign Application Priority Data

Dec. 26, 1995 [JP] Japan ..................................... 7-339448

[51] Int. Cl.$^6$ .................................................. G02F 1/1339
[52] U.S. Cl. ................................. 428/1; 349/155; 428/407
[58] Field of Search ....................... 428/1, 407; 349/155, 349/122

[56] References Cited

U.S. PATENT DOCUMENTS

| | | | |
|---|---|---|---|
| 5,054,890 | 10/1991 | Hanyu et al. | 349/155 |
| 5,130,831 | 7/1992 | Kohara et al. | 359/81 |
| 5,497,257 | 3/1996 | Hotta et al. | 349/155 |

FOREIGN PATENT DOCUMENTS

| | | |
|---|---|---|
| 1154028 | 6/1989 | Japan . |
| 1247154 | 10/1989 | Japan . |
| 1247155 | 10/1989 | Japan . |
| 436724 | 5/1990 | Japan . |
| 2261537 | 10/1990 | Japan . |

*Primary Examiner*—Alexander Thomas
*Attorney, Agent, or Firm*—Omri M. Behr, Esq.

[57] ABSTRACT

In the adhesive spacers which are synthesized as by the impact method in a high-speed air current, resin particles formed solely of an adhesive layer are included in a large amount besides those of adhesive spacers. An adhesive particulate composition is obtained by adjusting these resin particles in terms of grain size. The adhesive particulate composition containing (a) adhesive particles having a thermoplastic resin-containing layer cover at least part of the surfaces of the core particles having an average particle diameter in the range of 1 to 20 $\mu$m and a coefficient of variation of not more than 10% and (b) adhesive layer particles formed of the thermoplastic resin and having a ratio of the number of (b) the adhesive layer particles to that of (a) the adhesive particles of not more than 30%, adhesive spacers for a liquid crystal display panel formed of the composition, and the liquid crystal display panel using the spacers are disclosed.

16 Claims, 1 Drawing Sheet

Fig. 1

ADHESIVE PARTICULATE COMPOSITION, ADHESIVE SPACERS FOR LIQUID CRYSTAL DISPLAY PANEL, AND LIQUID CRYSTAL DISPLAY PANEL

BACKGROUND OF THE INVENTION

1. Field of the Invention

This invention relates to a novel adhesive particulate composition, spacers made of the composition and used for a liquid crystal display panel, and a liquid crystal display panel using the spacers.

2. Description of the Prior Art

The liquid crystal display panel (LCD) is composed of two opposed electrode substrates and spacers and liquid crystal substances wherein the spacers and liquid crystal substances are interposed between the electrode substrates. The spacers have been used for the purpose of keeping the liquid crystal layer at a uniform and constant thickness.

In recent years, the liquid crystal panels owing to the features of light weight and small thickness have been finding utility in portable information terminals such as portable telephones, pocket bells and on-vehicle appliances such as mobile communication systems and car navigation systems.

These applications, however, succumb to such loads as vibrations and shocks attendant on motions and tend to bring about migration and exfoliation of spacers and raise the problem of being no longer able to retain the thickness of the liquid crystal layer uniformly and constantly as compared with such applications as desk-top type personal computers, word processors, and TV's.

For the purpose of preventing such migration and exfoliation of spacers, the adhesive spacers in which the surfaces of spacer particles are coated with an adhesive agent have been developed. These spacers are scattered on a substrate with dry or wet system and then allowed to adhere fast to the substrate by heating.

The adhesive spacers of this type have been heretofore known to the art. As concrete examples of such known adhesive spacers, there may be cited adhesive spacers in which a fine resin powder is immobilized on the surfaces of hardened spherical fine particles, obtained by causing a fine resin powder having a heat deforming temperature in the range of 25° to 180° C. to be adsorbed by electrostatic force on the surfaces of hardened spherical fine particles of amino resin, dispersing the hardened spherical fine particles in an air current flowing at a high speed, and then exposing the hardened spherical fine particles to an impact (the high-speed air current impact method) (JP-A-01-154028) and adhesive spacers having a hotmelt type resin or an epoxy resin deposited on the surfaces of spherical fine particles which are obtained by dispersing spherical fine particles such as divinyl benzene cross-linked particles and silicate glass particles in a solution of the hotmelt type resin or the epoxy resin and then gradually lowering the temperature of the resultant dispersion or adding dropwise a poor solvent for the resin to the dispersion (the coacervation method) (JP-A-01-247154, JP-A-02-261537, JP-A-04-36723,and JP-A-04-36724). These adhesive spacers invariably have the surfaces of spherical fine particles coated with an adhesive layer of a resin exhibiting adhesiveness.

In the adhesive spacers which are synthesized by the high-speed air current impact method and the coacervation method, however, there are included extra resin particles formed solely of an adhesive layer in a large amount besides the adhesive spacers above. The resin particles have small through large particle diameters. In the adhesive spacers heretofore known to the art, the ratios of the number of resin particles to that of the adhesive spacers are as large as 50% or over. When these adhesive spacers are scattered on an electrode substrate, the resin particles are simultaneously scattered with the adhesive spacers. When the resin particles are inevitably exposed to the heat and the pressure which are used during the formation of a gap between two opposed electrode substrates, they are melted and thus impart damages such as scratching and covering the electrode substrates, alignment layer, color filters, etc. When the opposed electrode substrates and the adhesive spacers interposed therebetween are ultimately assembled to complete a liquid crystal display panel, the display panel has the problem of producing an image degraded in quality by the extra resin particles.

An object of this invention is to provide a novel adhesive particulate composition which contain adhesive layer particles formed solely of an adhesive layer as an impure component other than adhesive particles in a small amount.

Another object of this invention is to provide novel adhesive spacers which are formed of an adhesive particulate composition containing adhesive particles serving to retain a uniform and constant gap between electrode substrates and prevent spacers from migration and exfoliation and containing adhesive layer particles formed solely of an adhesive layer other than adhesive particles in a small amount.

Yet another object of this invention is to provide a liquid crystal display panel which allays damage to electrode substrates and improves the image of display in quality.

SUMMARY OF THE INVENTION

The objects mentioned above are achieved by an adhesive particular composition comprising (a) adhesive particles having a thermoplastic resin-containing layer cover at least part of the surfaces of the core particles having an average particle diameter in the range of 1 to 20 $\mu$m and a coefficient of variation of not more than 10% and (b) adhesive layer particles formed of the thermoplastic resin wherein a ratio of the number of (b) the adhesive layer particles to that of (a) the adhesive particles is not more than 30%.

These objects are further achieved by adhesive spacers for a liquid crystal display panel which are formed of the adhesive particulate composition mentioned above.

These objects are also achieved by a liquid crystal display panel using the adhesive spacers for a liquid crystal display panel mentioned above as the spacers to be interposed between electrode substrates.

The adhesive particulate composition of this invention, as described above, comprises (a) adhesive particles having a thermoplastic resin-containing layer cover at least part of the surfaces of the core particles having an average particle diameter in the range of 1 to 20 $\mu$m and a coefficient of variation of not more than 10% and (b) adhesive layer particles formed of the thermoplastic resin wherein a ratio of the number of (b) the adhesive layer particles to that of (a) the adhesive particles is not more than 30%, therefore, it can reduce adverse effects of the adhesive layer particles because it contains the adhesive layer particles at a small proportion. The use of the composition of this quality permits provision of spacers which are capable of retaining a uniform and constant gap between electrode substrates and also allows prevention of the spacers from migration and exfoliation. Further, the use of these spacers allows alleviation of damage to the electrode substrates and permits provision of a liquid crystal display panel capable of producing an image of improved quality.

DESCRIPTION OF THE PREFERRED EMBODIMENT

Now, this invention will be described in detail below.
Adhesive Particulate Composition The adhesive particles (a) to be used in this invention comprise core particles and a thermoplastic resin. These core particles, when used in a liquid crystal display panel, for example, require to retain a liquid crystal layer in a uniform and constant thickness. The average particle diameter of the core particle is in the range of 1 to 20 $\mu$m, preferably 1 to 15 $\mu$m, and most preferably 1.5 to 12 $\mu$m.

If the average particle diameter deviates from the range specified above, the core particle will be no longer usable as spacers for a liquid crystal panel. The coefficient of variation (CV) of the core particles is not more than 10%, preferably not more than 8%, and most preferably not more than 6%. If this coefficient of variation exceeds 10%, the core particles used in a liquid display panel will incur difficulty in retaining the liquid crystal layer at a uniform and constant thickness and tend to disrupt the evenness of an image to be produced. The terms "average particle diameter" and "coefficient of variation" as used herein are as defined by the methods described in the examples which will be cited herein below.

The core particles of the quality described above are known in various types. Organic cross-linked polymer particles or inorganic particles may be cited. Appropriately, they are in a spherical shape.

The organic cross-linked polymer particles include, for example, hardened particles of amino resin which are obtained by the condensation of at least one amino compound selected from the group consisting of benzoguanamine, melamine, and urea, preferably benzoguanamine, with formaldehyde as disclosed in JP-62-068811 and divinyl benzene cross-linked resin particles which are obtained by the homopolymerization of divinyl benzene or the copolymerization thereof with other vinyl monomer as disclosed in JP-A-01-144429.

The inorganic particles include spherical fine particles of glass, silica, alumina, etc. In the sense of facilitating the prevention of an electrode substrate, oriented membrane, or color filter from damage and the uniformity of a gap for separating substrates, the organic cross-linked polymer particles prove advantageous and the hardened particles of amino resin and the divinyl benzene cross-linked resin particles prove particularly desirable among other organic cross-linked polymer particles.

The organic cross-linked polymer particles or the inorganic particles may be optionally colored with a dye or a pigment.

The adhesive particles (a) have at least part, specifically part or whole, of the surfaces of core particles coated with a layer containing a thermoplastic resin. The surfaces of the core particles may be chemically bound with the thermoplastic resin. The average particle diameter of the adhesive particles (a) is 1 $\mu$m or over and not more than 22 $\mu$m, preferably 1 $\mu$m or over and not more than 17 $\mu$m, and more preferably 1.5 $\mu$m or over and not more than 14 $\mu$m. Though the thickness of the layer containing the thermoplastic resin is not defined, it is generally in the range of 0.01 to 2 $\mu$m, preferably in the range of 0.05 to 1 $\mu$m.

The thermoplastic resin which coats part or the whole of the surfaces of the core particles mentioned above does not need to be particularly limited so long as it is capable of acting as an adhesive agent for electrode substrates. As a concrete example of the thermoplastic resin, the homopolymer or the copolymer of an ethylenically unsaturated monomer may be cited. As concrete examples of the ethylenically unsaturated monomer, there is cited, for example, ethylene, propylene, vinyl chloride, vinyl acetate, styrene, vinyl toluene, a-methyl styrene, and (meth)acrylic esters (for example, methyl (meth)acrylate, ethyl (meth)acrylate, n-propyl (meth)acrylate, isopropyl (meth)-acrylate, butyl (meth)acrylate, hexyl (meth)acrylate, lauryl (meth)acrylate, and cyclohexyl (meth)acrylate). Among other ethylenically unsaturated monomers mentioned above, (meth)acrylic esters and styrene prove particularly advantageous. As the thermoplastic resin, (meth)acrylic type resins and (meth)-acryl-styrene type resins prove most preferable from the viewpoint of adhesiveness.

Besides the homopolymers and copolymers of ethylenically unsaturated monomer mentioned above, polyesters such as polyethylene terephthalate and polybutylene terephthalate, various polyamides, polycarbonates, and epoxy resins are usable.

Properly, the thermoplastic resin has a glass transition temperature in the range of 40° to 100° C., especially 45° to 90° C., and preferably 50° to 80° C. If the glass transition temperature is less than 40° C., the adhesive particulate composition of this invention will have the possibility of inducing melting of the individual particles during storage or, when the composition is scattered on an electrode substrate, degrading the dispersibility thereof. Conversely, if the glass transition temperature exceeds 100° C., the thermoplastic resin forming the adhesive layer will not be easily melted when the composition is exposed to heat and pressure during the assembly of a liquid crystal display panel and then will possibly manifest insufficient adhesiveness to the electrode substrate.

The adhesive strength of the adhesive particles (a) to a polyimide appropriately is not less than 10%, preferably not less than 20%, further preferably not less than 30%, more preferably not less than 40%, and most desirably not less than 50%. If the adhesive strength is less than 10%, the spacers will tend to undergo migration and exfoliation, incur difficulty in retaining the liquid crystal layer at a uniform thickness, and degrade the image produced in the liquid crystal display panel in quality because of poor adhesiveness of the spacers to the electrode substrate. The term "adhesive strength" of the adhesive particles (a) to a polyimide as used herein is as defined by the method described in the examples which will be cited herein below.

Next, the adhesive layer particles (b) to be used in this invention are particles which are solely made of the thermoplastic resin mentioned above. The average particle diameter of these particles is not more than 2 $\mu$m, preferably not more than 1.8 $\mu$m, more preferably not more than 1.5 $\mu$m, and most preferably not more than 1.0 $\mu$m.

If the average particle diameter exceeds 2 $\mu$m, the adhesive layer particles will possibly melt when exposed to heat and pressure during the assembly of a liquid crystal display panel, increase the area in which the electrode substrate, alignment layer, or color filter is covered, deprive the affected portion of operability, and degrade the image produced on the liquid crystal display panel in quality.

The thermoplastic resin which is usable for the adhesive layer particles (b) is the same as the thermoplastic resin which is used for coating the surfaces of core particles in the adhesive particles (a) mentioned above.

The ratio of the number of the adhesive layer particles (b) to that of the adhesive particles (a) mentioned above is not more than 30%, preferably 0 (0<) and not more than 25%, further preferably 0.01 to 20%, more preferably 0.1 to 15%, and most preferably 0.1 to 10%. If the adhesive layer particles (b) are present in a proportion exceeding 30% in the adhesive particulate composition, the adhesive layer particles will melt on exposure to heat and pressure during the assembly of a liquid crystal display panel, for example, increase an area in which the electrode substrate, alignment layer, or color filter is covered, prevent an image from being displayed, and degrade the image to be displayed on the liquid crystal display panel in quality. The adhesive spacers known heretofore in the art suffer persistence of adhesive layer particles (b) in a large amount and, when applied to a liquid crystal display panel, inevitably bring about degradation of the produced image in quality. The adhesive particles (a) enjoy improved flowability when the adhesive layer particles (b) are present in a small amount. The adhesive layer particles (b) exhibit improved flowability when they are such fine particles as have an average particle diameter of not more than 2 $\mu$m, preferably not more than 1.8 $\mu$m, more preferably not more than 1.5 $\mu$m, and most preferably not more than 1.0 $\mu$m. When the composition is used for the spacers in a liquid crystal display panel, the improved flowability of the adhesive particles (a) results in improving the composition in scatterability on the substrate.

The ratio of the number of the adhesive layer particles (b) to that of the adhesive particles (a) is determined by the method described in the example which will be cited herein below.

The composition of the present invention is not particularly discriminated on account of the state of presence of the adhesive particles (a) and the adhesive layer particles (b). The adhesive particles (a) and the adhesive layer particles (b) maybe present independently of each other or the adhesive layer particles (b) may be in contact with the surfaces of the adhesive particles (a).

The ratio of the weight of the total thermoplastic resin to that of the core particles in the adhesive particulate composition of this invention is more than 0 (0<) and not more than 30%, preferably 1 to 20%, and especially preferably 2 to 15%. If this ratio exceeds 30%, the adhesive layer will unduly grow in volume and, when melted, will unduly increase the area in which the electrode substrate, alignment layer, or color filter is covered, and will possibly degrade the image produced on a liquid crystal display panel in quality. Conversely, if the ratio is unduly small, the adhesive strength will be unduly lowered.

Now, the method for the production of the adhesive particulate composition of this invention will be described below. The following method is one example and is not critical for this invention.

The method for the production of the adhesive particulate composition comprises the following three steps.

(1) The step of coating at least part of the surfaces of the core particles mentioned above with the thermoplastic resin mentioned above (coating step)

The product of this step contains adhesive layer particles (b) having various particle diameters in a wide range besides adhesive particles (a) (hereinafter referred to as "coated particulate composition").

(2) The step of removing the part of adhesive layer particles (b) larger than average particle diameters of the adhesive particles (a) mentioned above (coarse particle removing step)

(3) The step of removing the part of adhesive layer particles (b) smaller than average particle diameters of the adhesive particles (a) mentioned above (fine particle removing step).

First, the coating step will be described.

Though the method for coating the surfaces of core particles with the thermoplastic resin is not particularly limited, the method which comprises adding the core particles to a solution of the thermoplastic resin, thoroughly dispersing them in the solution by stirring the solution, then removing the solvent from the resultant dispersion by vaporization, and pulverizing the resultant solid residue and the method which comprises melting the thermoplastic resin, then dispersing the core particle in the resultant melt, thoroughly dispersing them in the melt by kneading, cooling the resultant dispersion, and thereafter pulverizing the solid mass consequently formed, for example, are conceivable.

Besides the methods mentioned above, such heretofore known methods for coating with resin as the in situ polymerization method, coacervation method, surface polymerization method, in-liquid hardening coating method, in-liquid drying method, high-speed air current impact method, in-air suspension coating method, and spray drying method which are described in detail in "Surface Modification" (General Survey of Chemistry, No. 44, pages 45 to 52, compiled by Japan Chemical Society and published in 1987) and "Technique for Surface Modification and Impartation of High function to Powder" (Surface, Vol. 25, No. 1, pages 1–19 and cover photographs, published in 1987) are available for the surface coating under discussion. These methods prove more appropriate. Particularly, the high-speed air current impact method effects the coating of the surfaces of core particles with a thermoplastic resin by mixing the core particles with a powder of plastic resin, dispersing the resultant mixture in a gaseous phase, and exerting a mechanical thermal energy formed predominantly of impact force on the core particle and the thermoplastic resin powder. It proves most appropriate because it attains the necessary coating with simplicity. The average particle diameter of the thermoplastic resin powder to be used in this case is not more than 2 $\mu$m, preferably not more than 1.8 $\mu$m, more preferably not more than 1.5 $\mu$m, and most preferably not more than 1 $\mu$m.

The devices which utilize this high-speed air current impact method may include Hybridization System produced by Nara Kikai Seisakusho K. K. in Japan, Mechanofusion System produced by Hosokawa Micron K. K. in Japan, and Cryptoron System produced by Kawasaki Jukogyo Kabushiki Kaisha in Japan.

During the coating of the surfaces of core particles with the thermoplastic resin mentioned above, the thermoplastic resin may be chemically bonded to the surfaces of the core particles.

Though the adhesive particles (a) mentioned above are obtained as described above, adhesive layer particles (b) of thermoplastic resin of varying particle diameters occur in a large amount simultaneously as mixed therewith (coated particulate composition). The adhesive layer particles (b) of varying particle diameters occur herein because the individual particles of the thermoplastic resin powder are suffered to collide against and coalesce with one another. Generally, the adhesive layer particles (b) are present in a ratio of number of particles of not less than 100%, or at least not less than 50%, relative to the adhesive particles (a).

Next, the coarse particles removing step will be described below.

The coated particulate composition mentioned above contains the adhesive particles (a) and the adhesive layer particles (b) having various particle diameters. The present step consists in removing the part of adhesive layer particles (b) larger than average particle diameters of the adhesive particles (a). The removal is generally effected by classifying the coated particulate composition by (the mesh method) the use of a mesh having larger opening diameters than the average particle diameter of the adhesive particles (a), preferably a mesh having average opening diameters 0.5 μm to 10 μm, preferably 1 to 8 μm, and more preferably 1 to 5 μm, larger than the average particle diameter of the adhesive particles (a).

First, a solvent which is substantially incapable of dissolving the thermoplastic resin forming the adhesive layer of the adhesive particles (a) and the adhesive layer particles (b) and capable of dispersing the particles (a) and (b) is selected and the coated particulate composition is dispersed in the solvent by the use of an ultrasonic homogenizer.

Since the adhesive particles (a) must be isolated ultimately from the solvent, the solvent to be used herein appropriately has a low boiling point. An organic solvent having a boiling point of not more than 120° C. under normal pressure proves advantageous. Among other organic solvents answering this description, an alcohol having a boiling point of not more than 120° C. under normal pressure proves particularly advantageous. Especially when the thermoplastic resin to be used is a (meth)acrylic resin or a (meth) acryl-styrene resin, an alcohol of 1 to 3 carbon atoms proves advantageous. Among other alcohols of 1 to 3 carbon atoms, methanol or ethanol proves particularly advantageous.

The dispersion mentioned above is wet classified by the use of a mesh having an average opening diameter larger than the average particle diameter of the adhesive particles (a), preferably by the use of a mesh having an average opening diameter in the range of 0.5 to 10 μm, preferably in the range of 1 to 8 μm, and more preferably 1 to 5 μm, plus the size of average particle diameter of the adhesive particles (a). From the viewpoint of preventing leakage of coarse particles through the mesh, the opening diameters of the mesh are appropriately distributed sharply. Specifically, the whole opening diameters of the mesh properly fall within the average opening diameter ±3 μm, preferably within the average opening diameter ±2 μm, and most preferably within the average opening diameter ±1 μm. The appropriateness of the mesh grows in proportion as the opening ratio thereof increases because the productivity of the mesh grows proportionately to the increase in the opening ratio thereof. The appropriate opening ratio may be not less than 2%, preferably not less than 4%. Since the mesh while operating for the classification tends to clog, it is proper to carry out this classification with the dispersion exposed to an ultrasonic wave. Since the exposure to the ultrasonic wave causes the temperature of the dispersion to rise possibly to the extent of inducing fusion and agglomeration of the particles (a) and (b), it is proper to keep the dispersion cooled and prevented from temperature elevation.

The material for the mesh is not particularly limited. Such metals as Fe, SUS, Ni, Cr, Ag, Au, and Pt and such resins as nylon and polyester are available for the mesh. Though the type of the mesh due to the method of manufacture is not particularly limited, such types as plain weave, twill weave, plain mat weave, traverse mat weave, sintered sieve, and electro-formed sieve are conceivable. Appropriately, the mesh requires to have a sharp distribution of opening diameters as described above because the efficiency of removal of the adhesive layer particles (b) grows proportionately to the sharpness of distribution. By the coarse particles removing step described above, the part of adhesive layer particles (b) having particle diameters larger than the average particle diameter of the adhesive particles (a) are removed.

Now, the fine particles removing step will be described below.

This step consists in removing the part of adhesive layer particles (b) having particle diameters smaller than the average particle diameter of the adhesive particles (a). This removal is attained by the mesh method which comprises classifying the coated particulate composition by the use of a mesh having opening diameters smaller than the average particle diameter of the adhesive particles (a), preferably a mesh having an average opening diameter not less than 3 μm, preferably not less than 2 μm, smaller than the average particle diameter of the adhesive particles (a), or by the decanting method which comprises repeating the operation of decantation relying on the phenomenon of spontaneous sedimentation.

First, the mesh method will be described. The dispersion which has undergone the coarse particles removing step (the remaining portions of the removal of the part of adhesive layer particles (b) having particle diameters larger than the average particle diameter of the adhesive particles (a)) is subjected to wet classification by the use of a mesh having opening diameters smaller than the average particle diameter of the adhesive particles (a), preferably a mesh having an average opening diameter not less than 3 μm, preferably not less than 2 μm, smaller than the average particle diameter of the adhesive particles(a). Appropriately, the mesh requires the opening diameters thereof to be distributed sharply because the yield of the adhesive particles (a) grows proportionately to an increase in the sharpness of distribution. Properly, the whole opening diameters of the mesh fall within the average opening diameter ±2 μm, preferably within the average opening diameter ±1 μm. The appropriateness of the mesh grows in proportion as the opening ratio thereof increases. Properly, the opening ratio is not less than 2%, preferably not less than 4%. Since the mesh while operating for the classification tends to clog, it is proper to carry out this classification with the dispersion exposed to an ultrasonic wave. It is proper to keep the dispersion being classified cooled and prevent it from the temperature elevation which results in fusing and agglomerating the adhesive particles (a). It is also proper to continue supply of the solvent to the dispersion under treatment and prevent the adhesive particles (a) from drying on the mesh.

The materials which are effectively used for the mesh used herein are the same as those enumerated above in the description of the coarse particles removing step.

Now, the decanting method will be described below. The spontaneous sedimentation is defined by the following Stoke's formula. The adhesive particles (a) and the adhesive layer particles (b) can be classified by decantation mainly by varying the kind of dispersant properly. The devices which utilize the Stoke's theory on spontaneous sedimentation are produced by Aroma Kagaku Kikai Kogyo K. K. in Japan and marketed under tradenames "Mainoclassifier", "Staticron", "Centricron", and "Hiaccurator." These devices are capable of classifying powders of the order of submicrons or microns. The decanting method may be applied for the coarse particles removing step.

Optionally, the coarse particles removing steam may be carried out subsequently to the fine particles removing step. The two steps, when necessary, may be simultaneously carried out.

$$V=2/9 \cdot a^2(\rho-\rho_0)g/\eta$$

wherein V stands for sedimentation velocity, a for particle diameter, $\eta$ for viscosity coefficient of dispersant, $\rho$ for density of particles, $\rho_0$ for density of dispersant, and g for gravitational acceleration.

When the mesh method or the decanting method described above with respect to coarse particles or the fine particles removing step is carried out, it is difficult to attain thorough removal of the part of adhesive layer particles (b) having particle diameters larger or smaller than the average particle diameter of the adhesive particles (a) with the yield of the adhesive particles (a) or the productivity kept at a high level. The thorough removal, therefore, requires the mesh method or the decanting method to be infinitely repeated. For the adhesive particulate composition to be used for adhesive spacers in a liquid crystal display panel, therefore, it is important to prevent the composition from degrading the image produced on a liquid crystal display panel in quality specifically by setting the ratio of the number of adhesive layer particles (b) to that of the adhesive particles (a) at a level of not more than 30%, preferably not more than 25%, further preferably in the range of 0.1 to 20%, more preferably in the range of 0.1 to 15%, and most preferably in the range of 0.1 to 10%. Appropriately at this time, the average particle diameter of the adhesive layer particles (b) is not more than 2 $\mu$m, preferably not more than 1.8 $\mu$m, more preferably not more than 1.5 $\mu$m, and most preferably not more than 1.0 $\mu$m.

Some of the heretofore known adhesive spacers have not undergone the coarse particles removing step and the fine particles removing step and others have failed to attain thorough removal of the adhesive layer particles (b) on account of inferior classification due to the use of a sieve having large opening diameters or the adoption of decantation deficient in operational efficiency (the ratio of the number of the particles (b) to that of the particles (a) generally rises above 50% in the conventional spacers). When these conventional spacers are used in a liquid crystal display panel, the degradation of an image in quality due to the residual adhesive layer particles (b) is inevitable. The adhesive particulate composition of this invention, the adhesive spacers for a liquid crystal display panel which are formed of the adhesive particulate composition as will be specifically described herein below, and the liquid crystal display panel using the adhesive spacers have never been known to the art.

When the dispersion having the ratio of the number of the particles (b) to that of the particles (a) lowered to a level of not more than 30% is filtered, dried, and disintegrated at such a temperature as avoids melting the thermoplastic resin, the adhesive particulate composition of this invention is obtained which has the adhesive particles (a) in a discrete state as a main component and contains the adhesive layer particles (b) so many that the ratio of the number thereof to that of the particles (a) may be not more than 30%, preferably more than zero and not more than 25%, further preferably in the range of 0.01 to 20%, more preferably in the range of 0.1 to 15%, and most preferably in the range of 0.1 to 10%.

Adhesive Spacers for Liquid Crystal Display Panel

The adhesive particulate composition of this invention is useful as adhesive spacers for a liquid crystal display panel. When the spacers are interposed between electrode substrates to form a liquid crystal display panel and then exposed to heat and pressure, the thermoplastic resin as the adhesive layer melts, adheres to the electrode substrates, and settles fast after being cooled and solidified. Since the spacers are rendered sparingly movable in the gap between the electrode substrates consequently, the prevention of the alignment layer or color filter from damage, the retention of the uniformity of the gap for liquid crystal, and the improvement of the image on a liquid crystal display panel in quality can be fulfilled. Particularly, since the spacers have the adhesive layer particles (b) in such a low content that the ratio of the number thereof to that of the adhesive particles (a) may be not more than 30%, preferably more than 0 (021) and not more than 25%, further preferably in the range of 0.01 to 20%, more preferably in the range of 0.1 to 15%, and most preferably in the range of 0.1 to 10%, the area covering the surfaces of electrode substrates, alignment layer, and color filter decreases after, the adhesive layer particles (b) exclusively melt, adhere fast to the substrates, as a consequence improving prominently the image on a liquid crystal display panel in quality as compared with the heretofore known adhesive spaces. When the core particles forming the adhesive particles (a) in the adhesive spacers are colored by incorporating therein a dye and/or a pigment, for example, they are at an advantage in preventing possible light leaking therethrough and enhancing the contrast of the image.

When the thermoplastic resin forming the adhesive particles (a) is similarly colored by incorporating therein a dye and/or a pigment, for example, it can bring about the advantage of preventing possible light leaking therethrough and enhancing the contrast of the image.

Liquid Crystal Display Panel

The liquid crystal display panel of this invention has interposed between the electrode substrates the spacers for a liquid crystal display panel according to this invention instead of the conventional spacers. It has a gap identical or substantially equal to the particle diameter of the spacers. The quantity of the spacers thus used is generally in the range of 30 to 1000 pieces/mm$^2$, preferably 40 to 500 pieces/mm$^2$, more preferably 50 to 400 pieces/mm$^2$, and most preferably 60 to 300 pieces/mm$^2$. When the core particles forming the adhesive particles (a) are inorganic particles, the quantity of the spacers is so small as to fall in the range of 30 to 100 pieces/mm$^2$, preferably 40 to 80 pieces/mm$^2$. When the core particles are organic cross-linked polymer particles, the quantity is in the range of 60 to 1000 pieces/mm$^2$, preferably 70 to 500 pieces/mm$^2$, and more preferably 80 to 400 pieces/mm$^2$.

The liquid crystal display panel of the present invention comprises a first electrode substrate, a second electrode substrate, spacers for a liquid crystal display panel, a sealing material, and a liquid crystal. Here, the first electrode substrate is composed of a first transparent substrate and a first transparent electrode formed on one of the opposite surfaces of the first transparent substrate. The second electrode substrate is composed of a second transparent substrate and a second transparent electrode formed on one of the opposite surfaces of the second transparent substrate. The second electrode substrate has the surface thereof basing the second transparent electrode opposed to the surface of the first electrode substrate basing the first transparent electrode substrate. The spacers for a liquid crystal display panel are the spacers of this invention for a liquid crystal display panel and are interposed between the first electrode substrate and the second electrode substrate. The sealing agent serves the purpose of joining by adhesion the first electrode substrate and the second electrode substrate along the peripheral parts thereof. The liquid crystal fills the empty space which is enclosed with the first electrode substrate, the second electrode substrate, and the sealing agent.

For the liquid crystal panel of this invention, the same electrode substrates, sealing agent, liquid crystal, etc. as are used for the conventional liquid crystal display panel can be used in the same manner as heretofore employed, excepting the spacers. The electrode substrates are each possessed of a transparent substrate such as glass substrate or film substrate and a transparent electrode formed on one of the opposite surfaces of the transparent substrate. Optionally, they are further provided on the surface of the transparent substrate with an alignment layer so formed as to cover the transparent electrode. An epoxy resin adhesive sealing agent, for example, is used as the sealing agent. The liquid crystal to be used effectively herein may be any of the liquid crystals heretofore known to the art. As concrete examples of the known liquid crystals, biphenyl type, phenyl cyclohexane type, Schiff base type, azo type, azoxy type, benzoic ester type, terphenyl type, cyclohexycarboxylic ester type, biphenyl cyclohexane type, pyrimidine type, dioxane type, cyclohexylcyclohexane ester type, cyclohexyl ethane type, cyclohexene type, and fluoride type liquid crystals may be cited.

The manufacture of the liquid crystal display panel of this invention may be implemented, though not exclusively, by the following method. The liquid crystal display panel is obtained by uniformly scattering a batch of the spacers of this invention as inplane spacers by a wet or a dry technique on the electrode-bearing surface of one of the two electrode substrates, separately dispersing another batch of the spacers of this invention as sealed part spacers in an adhesive sealing agent such as epoxy resin, then applying the resultant dispersion by means of screen printing to the adhesive seal part of the other electrode substrate, superposing the latter electrode substrate on the former electrode substrate, keeping the superposed electrode substrates under appropriate pressure and heating them at a temperature in the range of 100° to 180° C. for 1 to 60 min. thereby hardening the dispersion intervening therebetween and meanwhile allowing the thermoplastic resin as the adhesive agent layer to melt and function as an adhesive agent for immobilizing the core particles to the substrates and preventing the core particles from migration or exfoliation, and then injecting a liquid crystal into the gap between the electrode substrates and sealing the hole formed in the gap for the injection.

As the inplane spacers, those of the spacers of this invention for a liquid crystal display panel which have the core particles or the adhesive layer thereof colored prove advantageous in respect that they do not easily allow light leaking therethrough.

The liquid crystal display panel of this invention can be used, similarly to the conventional liquid crystal display panel, as an image display element or part in television, personal computer, word processor, etc. Particularly in applications which readily dispose spacers to migration or exfoliation, this liquid crystal display panel is useful as a portable terminal or image element in portable telephones and pocket bells, or the like.

EXAMPLE

Now, examples of this invention and comparative examples deviating from the scope of this invention will be cited below. It should be noted, however, that this invention is not limited to these examples.

Average Particle Diameter and Coefficient of Variation of Core Particles and Ratio of Weight of Total Thermoplastic Resin to Core Particles A sample, 5 g in weight (let $P_1$ stand for the weight), of the adhesive particulate composition was placed in a cylindrical filter paper and subjected to Soxhlet extraction using a solvent capable of solving the thermoplastic resin (for example, tetrahydrofuran or toluene is preferable for (meth) acrylic resin or (meth)acryl-styrene resin or toluene or xylene for a polyolefin) to dissolve the thermoplastic resin covering the adhesive particles (a) and the adhesive layer particles (b). Then, the core particles were exclusively obtained, vacuum dried at 100° C., and weighed (let $P_2$ stand for the weight of the core particles). The ratio of weight (P) of the whole thermoplastic resin to the core particles was calculated by the following formula.

Ratio of weight (P) of the whole thermoplastic resin to the core particles $= (P_1-P_2)/P_2 \times 100$ The core particles thus obtained were identified by the FT-IR analysis and, at the same time, observed on an electron microscope. By actually measuring the diameters of 200 randomly selected particles in an electron micrograph, the average particle diameter, standard deviation of particle diameters, and coefficient of variation of particle diameters were calculated from the following formulas using the results of the measurement.

$$\text{Average particle diameter } (\overline{X}) = \frac{\sum_{i=1}^{n} Xi}{n} \quad n = 200$$

$$\text{Standard deviation } (\sigma) = \left[\frac{\sum_{i=1}^{n} (\overline{X} - Xi)^2}{n-1}\right]^{\frac{1}{2}} \quad n = 200$$

$$\text{Coefficient of variation } (\%) = (\sigma/\overline{X}) \times 100$$

Average Particle Diameter of Adhesive Particles (a)

This attribute was determined by following the procedure used for the core particles described above and according to the formula given correspondingly above.

Glass Transition Temperature of Thermoplastic Resin

The solution of the thermoplastic resin obtained by the Soxhlet extraction mentioned above was distilled in an evaporator to expel the solvent and the remaining material was vacuum dried at 100° C. to obtain the thermoplastic resin mass. The thermoplastic resin was identified by the FT-IR analysis. It was tested for glass transition temperature (Tg) by the use of an instrument produced by Parkin Elmer Corp. and marketed under product code of "DSC-7."

Ratio of Number of Adhesive Layer Particles (b) to that of Adhesive Particles (a)

A batch of the adhesive particulate composition was scattered on a slide glass and then observed and photographed with an optical microscope. The ratio of the numbers of particles (a) and (b) was determined by regarding, as adhesive layer particles (b), the particles having diameters exceeding (the average particle diameter of the core particles $+4 \sigma$) μm, those having diameters not exceeding (average particle diameter of the core particles $-4 \sigma$) μm and the particles having no spherical shape on the photo-graph. The average particle diameter was determined by reading particle diameters of at least five adhesive layer particles (b) selected in the photomicrograph and calculating the aforementioned formula using the result of the reading.

Adhesive Strength to Polyimide

A batch of the adhesive particulate composition was scattered on a polyimide film and heat-treated at 180° C. for 30 minutes. It was then cooled to room temperature. An adhesive tape (a polyvinyl chloride adhesive tape for electric insulation, produced by Sekisui Plastics Co., Ltd. in Japan and marketed under tradename of "Eslon") was applied to the sample-bearing surface of the film, pressed there against under 500 gf/cm² for three seconds, and then ripped off the film. The adhesive strength of the sample to polyimide was determined by taking count of the number of particles remaining on the film and calculating the ratio of residue by the following formula.

Adhesive strength (%)=(Number of particles remaining after the test/number of particles existing before the test)×100

Method for Manufacture of Liquid Crystal Display Panel

Figure 1:
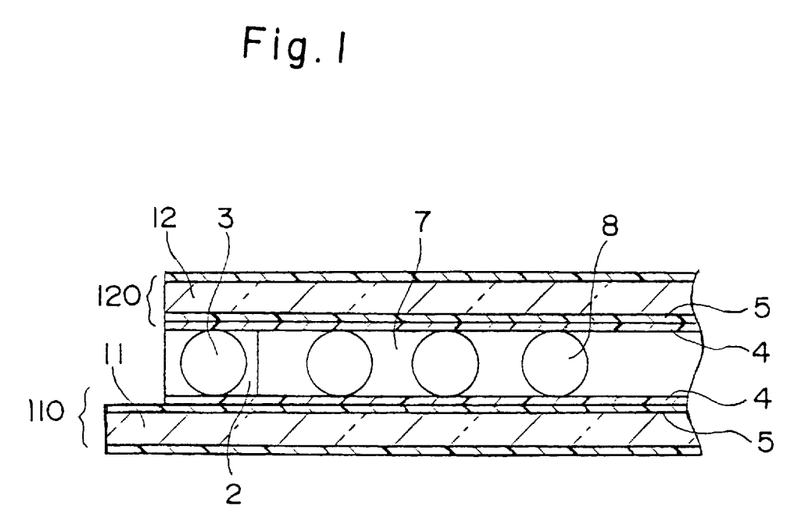
FIG. 1 is a partial cross section illustrating one example of the liquid crystal display panel of this invention.

First, a lower electrode substrate 110 was obtained by forming an electrode (for example, a transparent electrode) 5 and a polyimide alignment layer 4 on a lower glass substrate 11, 300 mm×345 mm×1.1 mm, as shown in FIG. 1 and then giving necessary rubbing to the resultant glass substrate. On the lower electrode substrate 110, a batch of the adhesive spacers (inplane spacers herein) 8 of this invention for a liquid crystal display panel was uniformly dry scattered.

Separately, an upper electrode substrate 120 was obtained by forming an electrode (for example, a transparent electrode) 5 and a polyimide alignment layer 4 on an upper glass substrate 12, 300 mm×345 mm×1.1 mm, and giving necessary rubbing to the resultant glass substrate. Then, the spacers of this invention for a liquid crystal display panel (sealed part spacers herein) 3 were dispersed in an epoxy resin adhesive sealing material 2 in an amount equivalent to a concentration of 2% by weight and the resultant dispersion was applied by screen printing to the adhesive seal part of the upper electrode substrate 120.

Finally, the upper and lower electrode substrates 120 and 110 were disposed with the electrode 5 and the alignment layer 4 thereof opposed to each other across the spacers 8 of this invention. The superposed substrate were compressed under 1 kg/cm² and meanwhile heated at 150° C. for 30 minutes to harden thermally the adhesive seal member 2. Then, a liquid crystal 7 was injected into the gap between the two electrode substrates 120 and 110 by vacuumizing the gap and then allowing it to resume atmospheric pressure. The part in the gap used for the injection was sealed.

Example 1

A coated particulate composition was obtained by mixing 35 g of cross-linked hardened spherical fine particles of benzoguanamine-melamine-formaldehyde condensate (having an average particle diameter of 7.30 $\mu$m and a coefficient of variation of 4.1%) as core particle with 3.5 g of a 2-ethylhexyl acrylate-styrene copolymer (having an average particle diameter of 0.8 $\mu$m and a glass transition temperature of 65° C.) as a thermoplastic resin and subjecting the resultant mixture to a coating treatment (coating step) by the use of Hybridization System NHS-O produced by Nara Kikai Seisakusho K. K. in Japan to coat the surfaces of the core particles with the thermoplastic resin.

Then, the coated particulate composition consequently obtained was dispersed in 1 liter of methanol and the resultant dispersion was passed through a mesh made of nylon and having an average opening diameter of 10 $\mu$m and having the whole opening diameters within the range of average opening diameter±1 $\mu$m (opening ratio 5.8%) (coarse particles removing step)

Further, the particles which passed the mesh were filtered with a mesh made of nylon and having an average opening diameter of 5 $\mu$m and having the whole opening diameters within the range of average opening diameter ±1 $\mu$m (opening ratio 4.3%) (fine particles removing step). The residue stopped on the mesh was extracted and redispersed in 1 liter of methanol. The resultant dispersion was suction filtered through a filter paper (opening diameter 3 $\mu$m) made of Teflon to remove methanol to the fullest possible extent. The residue of the filtration was vacuum dried at 40° C. for two hours. The resultant solid mass was disintegrated into individual particles to obtain an adhesive particulate composition 1.

The analyses of the adhesive particulate composition 1 are shown in Table 1.

TABLE 1

| | Adhesive particle (a) | | | | | Average particle diameter of adhesive particle (a) ($\mu$m) | Average particle diameter of adhesive layer particle (b) ($\mu$m) | Ratio of number of (b)/(a) (%) | Adhesive strength (%) | Total thermo plastic resin/core particle (%) |
|---|---|---|---|---|---|---|---|---|---|---|
| | Core particle | | | Thermoplastic resin | | | | | | |
| Run No. | Material | $\bar{X}$ ($\mu$m) | CV (%) | Material | Tg(°C.) | | | | | |
| Example 1 | Benzoguanamine-melamine formaldehyde hardened particle (white) | 7.3 | 4.1 | 2-Ethylhexyl acrylate-styrene copolymer | 65 | 7.6 | 1.5 | 2.5 | 73 | 7.4 |
| Example 2 | ↑ | 9.5 | 3.0 | ↑ | ↑ | 9.7 | 1.6 | 1.2 | 85 | 8.9 |
| Example 3 | ↑ | 3.7 | 5.4 | ↑ | ↑ | 4.1 | 1.8 | 5.9 | 72 | 14.7 |
| Example 4 | ↑ (dark blue) | 5.8 | 4.6 | ↑ | ↑ | 6.0 | 1.8 | 3.6 | 68 | 6.9 |
| Example 5 | Divinyl benzene cross-linked particle (white) | 6.0 | 5.5 | Methyl methacrylate-butyl acrylate copolymer | 60 | 6.3 | 1.6 | 4.0 | 61 | 6.5 |
| Example 6 | Benzoguanamine-melamine formaldehyde hardened particle | 7.3 | 4.1 | 2-Ethylhexyl acrylate-styrene copolymer | 65 | 7.4 | 1.0 | 0.8 | 14 | 2.4 |

TABLE 1-continued

|  | Adhesive particle (a) | | | | Average particle diameter of adhesive | Average particle diameter of adhesive layer | Ratio of number of | Adhesive | Total thermo plastic resin/core |
|---|---|---|---|---|---|---|---|---|---|
|  | Core particle | | | Thermoplastic resin | | | | | |
|  |  | X̄ | CV | | particle | particle | (b)/(a) | strength | particle |
| Run No. | Material | (μm) | (%) | Material Tg(°C.) | (a) (μm) | (b) (μm) | (%) | (%) | (%) |
|  | (white) | | | | | | | | |

An STN type liquid crystal display panel, B5 folio in size, was produced by the method described above using the adhesive particulate composition 1. It produced images of perfect display quality free from uneven image density or deficiency in display.

Example 2

A coated particulate composition 2 was obtained by following the procedure of coating step of Example 1 while using cross-linked hardened spherical fine particles of benzoguanamine-melamine-formaldehyde condensate (having an average particle diameter of 9.5 μm and a coefficient of variation of 3.0%) instead. An adhesive particulate composition 2 was obtained by following the procesure of Example 1 while using a mesh made of nylon and having an average opening diameter of 12 μm and having the whole opening diameters within the range of average opening diameter ±1 μm at the coarse particles removing step and a mesh made of nylon and having an average opening diameter of 7 μm and having the whole opening diameters within the range of average opening diameter ±1 μm at the fine particles removing step instead.

When a TN type liquid crystal display panel, B5 folio in size, was produced by the use of the adhesive particulate composition 2, it produced images of perfect display quality free from uneven image density or deficiency in display similarly to the liquid crystal display panel of Example 1.

Example 3

A coated particulate composition 3 was obtained by following the procedure of coating step of Example 1 while using 30 g of cross-linked hardened spherical fine particles of benzoguanamine-melamine-formaldehyde condensate (having an average particle diameter of 3.7 μm and a coefficient of variation of 5.4%) as core particles and 9 g of a 2-ethylhexyl acrylate-styrene copolymer (having an average particle diameter of 0.8 μmandaglass transition temperature of 65° C.) as a thermoplastic resin instead. The coarse particles removing step was carried out by following the procedure of Example 1 while using a mesh made of Ni and having an average opening diameter of 5 μm and having the whole opening diameters within the range of average opening diameter ±1 μm instead.

Then, the fine particles removing step was carried out as follows.

The slurry consequently obtained was left standing at rest in a container, 80 cm in height, for two hours and then decanted to remove the slightly opacified upper part and collect a sediment. The sediment was again dispersed in methanol and the resultant dispersion was subjected to the decantation mentioned above three times.

The product of the fine particles removing step was processed in the same manner as in Example 1 to obtain an adhesive particulate composition 3. The analyses of this adhesive particulate composition 3 are shown in Table 1.

When a TFT type liquid crystal display panel, B5 folio in size, was produced by the use of the adhesive particulate composition 3, it produced images of perfect display quality free from uneven image density or deficiency in display similarly to the liquid crystal display panel of Example 1.

Example 4

An adhesive particulate composition 4 was obtained by following the procedure of coating step of Example 1 while using cross-linked hardened spherical fine particles of benzoguanamine-melamine-formaldehyde condensate (having an average particle diameter of 5.8 μm and a coefficient of variation of 4.6%) colored in dark blue instead. The analyses of this composition are shown in Table 1. When an STN type liquid crystal display panel, B5 folio in size, was produced by the use of the adhesive particulate composition 4, it produced images of perfect display quality free from uneven image density or deficiency in display similarly to the liquid crystal display panel of Example 1.

Example 5

A coated particulate composition 5 was obtained by dispersing 30 g of cross-linked spherical fine particles of divinyl benzene (having an average particle diameter of 6.0 μm and a coefficient of variation of 5.5%) as core particle in a 10% toluene solution of a methyl methacrylate-butyl acrylate copolymer (having a glass transition temperature of 60° C.) and slowly dropping n-hexane into the resultant dispersion thereby effecting the step of coating the surfaces of the particles with the methyl methacrylate-butyl acrylate copolymer by means of the coacervation method. An adhesive particulate composition 5 was obtained by carrying out the coarse particles removing step and the fine particles removing step in the same manner as in Example 1. The analyses of the composition 5 are shown in Table 1. When an STN type liquid crystal display panel, B5 folio in size, was produced by the use of the adhesive particulate composition 5, it produced images of perfect display quality free from uneven image density or deficiency in display similarly to the liquid crystal display panel of Example 1.

Example 6

An adhesive particulate composition 6 was obtained by following the procedure of Example 1 while changing the quantity of the thermoplastic resin to be used to 1.0 g.

The analyses of this composition are shown in Table 1. When an STN type liquid crystal display panel, B5 folio in size, was manufactured by the use of the adhesive particulate composition 6, it produced images of perfect display quality free from uneven image density or deficiency in display similarly to the liquid crystal display panel of Example 1.

Comparative Example 1

The coated particulate composition 1 obtained by the coating step in Example 1 was used herein as an adhesive particulate composition 7 for comparison. The analyses of this composition are shown in Table 2.

Comparative Example 3

The product obtained by performing the coating step and the coarse particles removing step and thereafter carrying out the decantation just once at the fine particles removing step in Example 3 was used herein as an adhesive particulate

TABLE 2

| | Adhesive particle (a) | | | | Average particle diameter of | Adhesive layer particle (b) | | Ratio of | | Total thermo |
|---|---|---|---|---|---|---|---|---|---|---|
| | Core particle | | Thermoplastic resin | | adhesive layer | | Average particle | number of | Adhesive | plastic resin/core |
| Run No. | Material | $\bar{X}$ ($\mu$m) | CV (%) | Material | Tg (°C.) | particle (a) ($\mu$m) | Observation with a microscope | diameter ($\mu$m) | (b)/(a) (%) | strength (%) | particle (%) |
| Comparative Example 1 | Benzoguanamine-melamine formaldehyde hardened particle (white) | 7.3 | 4.1 | 2-Ethylhexyl acrylate-styrene copolymer | 65 | 7.6 | Adhesive layer particles (b) having a particle diameter of not less than 10 $\mu$m other than those (b) having a particle diameter of not more than 3 $\mu$m are present | 3.8 | 62 | 79 | 10.0 |
| Comparative Example 2 | ↑ | ↑ | ↑ | ↑ | ↑ | ↑ | There are lots of adhesive layer particles (b) having a particle diameter of not more than 3 $\mu$m | 2.5 | 57 | 76 | 9.2 |
| Comparative Example 3 | ↑ | 3.7 | 5.4 | ↑ | ↑ | 4.1 | There are lots of adhesive layer particles (b) having a particle diameter of not more than 3 $\mu$m | 2.4 | 40 | 72 | 21.4 |

When an STN type liquid crystal display panel, B5 folio in size, was produced by using the adhesive particulate composition 7 for comparison in the same manner as in Example 1, it produced images abounding in uneven image density and deficiency of display. When the inner surface of the substrate was observed under a microscope, the adhesive layer particles (b) were found at many portions to cover and damage the alignment layer in wide areas.

Comparative Example 2

The product of the coating step and the coarse particles removing step in Example 1 (excluding the fine particles removing step) was used herein as an adhesive particulate composition 8 for comparison. The analyses of this composition are shown in Table 2. When an STN type liquid crystal display panel, B5 folio in size, was produced by using the adhesive particulate composition 8 for comparison in the same manner as in Example 1, it produced images abounding in uneven image density and deficiency of display. When the inner surface of the substrate was observed under a microscope, the adhesive layer particles (b) were found at many portions to cover the alignment layer in wide areas.

composition 9 for comparison. The analyses of this composition are shown in Table 2. When a TFT type liquid crystal display panel, B5 folio in size, was produced by using the adhesive particulate composition 9 for comparison in the same manner as in Example 1, it produced images abounding in uneven image density. When the inner surface of the substrate was observed under a microscope, the adhesive layer particles (b) were found at portions to cover the alignment layer in wide areas.

What is claimed is:

1. An adhesive particulate composition comprising
    (a) adhesive coated particles comprising a thermoplastic resin-containing layer covering at least part of the surface of core particles having an average particle diameter in the range of 1 to 20 $\mu$m and a coefficient of variation of not more than 10% and
    (b) adhesive layer particles formed of said thermoplastic resin
    wherein the ratio of the number of said adhesive layer particles (b) to that of said adhesive coated particles (a) is in the range of 0.1 to 10%.
2. A composition according to claim 1, wherein said core particles are organic cross-linked polymer particles.

3. A composition according to claim 2, wherein said organic cross-linked polymer particles is a hardened particle of at least one member selected from the group consisting of amino resin and divinyl benzene cross-linked resin particles.

4. A composition according to claim 1, wherein said thermoplastic resin has a glass transition temperature in the range of 40° to 100° C.

5. A composition according to claim 1, wherein said thermoplastic resin is at least one member selected from the group consisting of a (meth)acrylic type resin and a (meth) acryl-styrene type resin.

6. A composition according to claim 1, wherein said adhesive particles (a) exhibit an adhesive strength of not less than 10% to a polyimide.

7. A composition according to claim 1, wherein the weight ratio of all of the thermoplastic resin in the composition to said core particles in said composition exceeds 0 (0<) and does not exceed 30%.

8. A composition according to claim 1, wherein said adhesive layer particles (b) have an average particle diameter of not more than 2 $\mu$m.

9. A method of producing adhesive spacers of a liquid crystal display panel, which comprises adhering together:
   (a) adhesive coated particles having a thermoplastic resin-containing layer covering at least part of the surface of core particles having an average particle diameter in the range of 1 to 20 $\mu$m and a coefficient of variation of not more than 10% with
   (b) adhesive layer particles formed of said thermoplastic resin wherein the ratio of the number of said adhesive layer particles (b) to that of said adhesive particles (a) is in the range of 0.1 to 10%.

10. A liquid crystal display, comprising:
   a first electrode substrate having a circumferential edge;
   a second electrode substrate having a circumferential edge;
   said first electrode substrate and said second electrode substrate being bound to each other at their respective circumferential edges by a sealing layer;
   a spacer for the liquid crystal display comprising an adhesive particulate composition, interposed between said first electrode substrate and said second electrode substrate; and
   a liquid crystal packed into the space defined by said first electrode substrate, said second electrode substrate and said sealing layer;
   wherein said adhesive particulate composition comprises
      (a) adhesive coated particles having a thermoplastic resin-containing layer covering at least part of the surface of core particles having an average particle diameter in the range of 1 to 20 $\mu$m and a coefficient of variation of not more than 10% and
      (b) adhesive layer particles formed of said thermoplastic resin wherein a ratio of the number of said adhesive layer particles (b) to that of said adhesive particles (a) is on the range of 0.1 to 10%.

11. A liquid crystal display according to claim 10, wherein said core particles are organic cross-linked polymer particles.

12. A liquid crystal display according to claim 10, wherein said thermoplastic resin as a glass transition temperature in the range of 40° to 100° C.

13. A liquid crystal display according to claim 10, wherein said thermoplastic resin is at least one member selected from the group consisting of a (meth)acrylic type resin and a (meth)acryl-styrene type resin.

14. A liquid crystal display according to claim 10, wherein said adhesive coated particles (a) exhibit an adhesive strength of not less than 10% relative to polyimide.

15. A liquid crystal display according to claim 10, wherein the weight ratio of all of the thermoplastic resin in the composition to said core particles in said composition exceeds 0(0<) and does not exceed 30%.

16. A liquid crystal display according to claim 10, where said adhesive layer particles (b) have an average particle diameter of not more than 2 $\mu$m.

* * * * *